Feb. 27, 1945.  J. ROSAN  2,370,327
TUBULAR INSERT
Filed Feb. 13, 1943  2 Sheets-Sheet 1
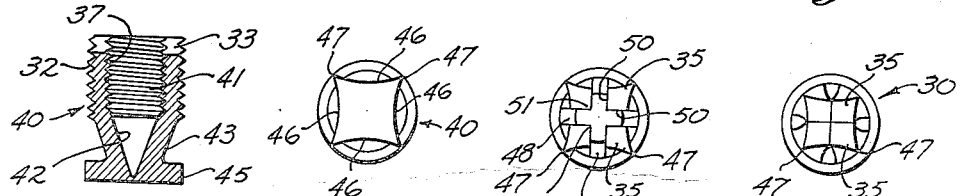
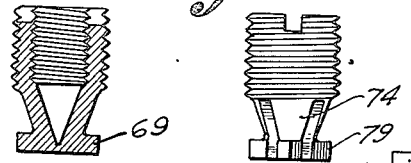
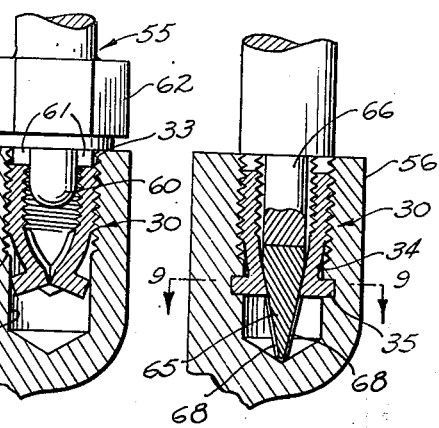
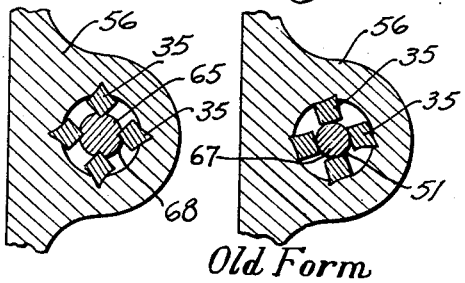
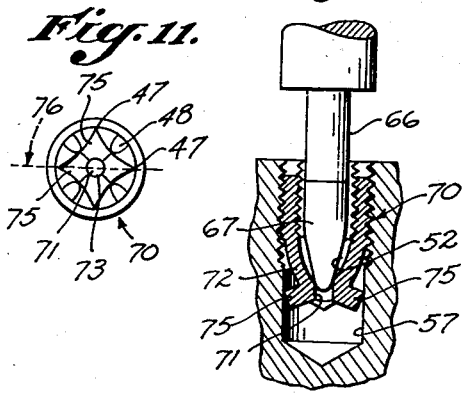
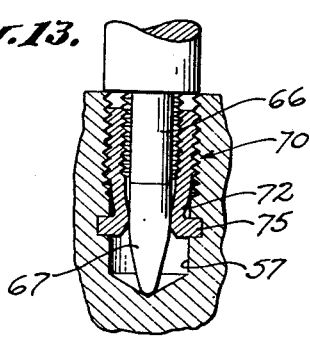
INVENTOR:
Joseph Rosan,
BY
ATTORNEY.

Feb. 27, 1945. J. ROSAN 2,370,327
TUBULAR INSERT
Filed Feb. 13, 1943 2 Sheets-Sheet 2
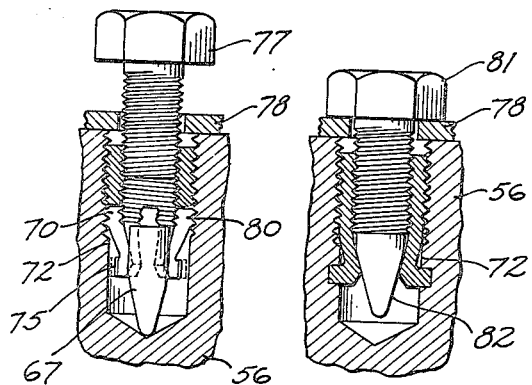
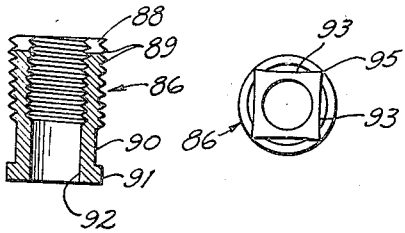
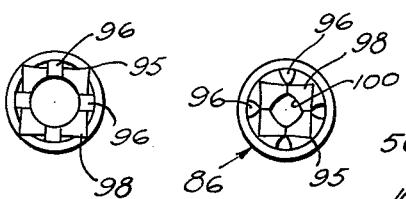
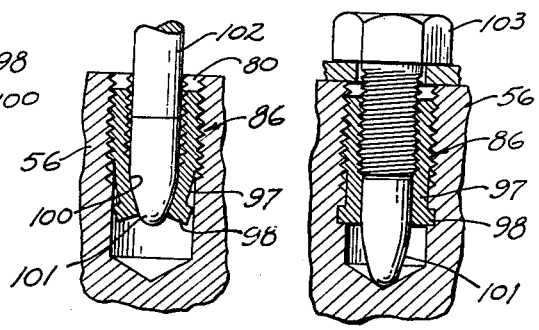
INVENTOR:
Joseph Rosan,
BY
ATTORNEY.

Patented Feb. 27, 1945

2,370,327

UNITED STATES PATENT OFFICE 2,370,327

TUBULAR INSERT

Joseph Rosan, North Hollywood, Calif.

Application February 13, 1943, Serial No. 475,774

4 Claims. (Cl. 85—2.4)

My invention relates to tubular inserts designed for anchorage in bores of bodies of relatively soft material for various purposes, including the purpose of making various connections with such bodies. For the present disclosure I elect to describe embodiments of the invention designed to provide screw-threaded attachment of objects to a body of relatively soft material, but it will be recognized that the invention may be applied to the construction of inserts for other purposes. For example, inserts constructed in accord with the same principles may be designed to serve as liners for such bores.

The present invention is especially applicable to the problem of providing means whereby threaded members such as screws and studs may be employed for effective connection to bodies of soft metals, wood, and various plastics. This problem is especially difficult when the connection must withstand vibration as well as ordinary stresses, for example, when threaded connections are to be relied upon for anchorage to airplane parts of aluminum, magnesium, and related alloys.

It is an object of the present invention to provide an insert for permanent anchorage in a bore in soft material in such manner as to afford highly effective resistance to withdrawal from the bore. I propose to provide a threaded insert that may be employed in a body of magnesium or aluminum alloy to retain a conventional screw therein against forces equal to the full tensile strength of the screw. I have found that an anchorage of the required effectiveness may be achieved by employing a tubular insert of a certain type with arms having anchorage projections or teeth for penetration of the surrounding soft material, a spreader means or wedge being forced into the tubular insert to spread the arms apart radially and thereby cause penetration by the projections or teeth.

One of the objects of my invention is to provide a novel and improved mode of cooperation between such a spreader means and the arms of the insert whereby the arms are prevented from twisting and whereby the teeth on the arms are positively or relentlessly guided for radial penetration of the surrounding material. In one practice of the invention it is my object to provide a combined screw and spreader means that will cooperate in this manner with the arms of the insert.

A further object in another practice of the invention is to provide for cooperation between the arms of the insert and a conventional screw threaded into the insert whereby final tightening rotation of the screw tends both to additionally spread the insert arms and to bind or lock the screw against withdrawal.

These and other objects of the invention will be apparent from the following detailed description, taken with the accompanying drawings.

In the drawings, which are to be considered as illustrative only:

Fig. 1 is a sectional view of a blank at an intermediate stage in my method of manufacturing one form of tubular insert;

Figs. 2, 3 and 4 are end views of the blank at subsequent stages in the process of manufacture;

Fig. 5 is a sectional view of the completed insert;

Fig. 6 is a side elevation of the completed insert;

Fig. 7 is a sectional view of an insert and a portion of a body showing the insert being threaded into the bore of the body;

Fig. 8 is a similar view showing the insert in its final expanded configuration;

Fig. 9 is a transverse section taken as indicated by the line 9—9 of Fig. 8;

Fig. 10 is a view similar to Fig. 9 showing the result of employing a different spreading means;

Fig. 11 is an end view of a modified form of the insert;

Fig. 12 is a sectional view of the modified insert installed in a bore in preparation for expansion by wedging action;

Fig. 13 is a similar view of the insert after expansion;

Fig. 14 is a view similar to Fig. 1 showing a modified blank for manufacturing an insert;

Fig. 15 is a view similar to Fig. 6 showing the finished insert obtained from the blank of Fig. 14;

Fig. 16 is a sectional view of an insert indicating how a cap screw may cooperate therewith in a novel manner;

Fig. 17 is a sectional view showing a cap screw designed to function as a spreader for cooperation with the insert;

Fig. 18 is a sectional view of a blank at an intermediate stage in the process of producing another form of the tubular insert;

Figs. 19, 20, and 21 are end views showing successive stages in processing the blank of Fig. 18;

Fig. 22 is a sectional view showing the resulting insert threaded into a bore in preparation for expansion; and Fig. 23 is a similar view of the insert fully expanded and engaged by a cap screw.

Figs. 1 to 4 illustrate my preferred method of manufacturing the tubular insert shown in section in Fig. 5 and in elevation in Fig. 6. The finished insert generally designated 30 has a cylindrical body 31 that is preferably, but not necessarily, of broken surface configuration for peripheral engagement with surrounding material. Thus, the cylindrical body 31 may be formed with external threads 32 and may have diametrically disposed recesses 33 at its outer end for engagement by a screw-driver or similar tool. What may be termed the inner or expansible end of the insert comprises a plurality of longitudinal extensions or arms 34 integral with the cylindrical body 31, the arms 34 having outwardly directed anchoring projections or teeth 35. The teeth 35 are adapted to penetrate surrounding material when the plurality of arms 34 is radially expanded by employment of a suitable spreader or wedging means. After the insert is anchored, it may receive and effectively engage a conventional screw or stud by virtue of inner threads 37 cut in the inner cylindrical wall of the body 31.

While such an insert may be produced by various procedures including casting and rolling operations, I prefer a method of manufacture that for the most part, if not entirely, consists of conventional machine operations whereby the inserts may be produced in mass by automatic screw machines. Figs. 1 to 4 exemplify the various steps of such a method.

Fig. 1 shows a blank generally designated 40 at an early stage in the manufacturing process, the blank being a piece of conventional round stock of suitable diameter. At this particular stage, a blind bore 41 with a tapered inner end 42 has been formed and tapped to produce the inner threads 37. The recesses 33 have been cut and the periphery of the blank has been machined to produce the external threads 32. Beyond the external threads 32 the blank has been cut away circumferentially to form a tapering neck 43 of reduced diameter and to form what may be termed a radial flange 45 at the inner end of the blank.

Fig. 2 indicates how four lateral cuts 46 preferably of curved configuration may be made in the radial flange 45 to produce four anchoring or penetrating edges 47, which edges will comprise the points of the finished teeth 35. The next step is to cut slots in the flange 45 and neck 43 of the blank to form the various arms 34. As indicated in Fig. 3, a simple procedure is to make two diametrical cuts, thereby forming four slots 48. It will be noted that the slots 48 complete the formation of the teeth 35 as well as of the arms 34. The outer ends of the arms 34 may be regarded as the inner ends of the teeth and it will be noted that these ends have two inner surfaces or faces 50 defining an inner edge 51 of substantial sharpness. Each pair of converging inner surfaces 50 may be regarded as forming a tapered heel.

To complete the manufacture of the insert 30, it is merely necessary to contract the group of arms 34 radially by bending the individual arms inwardly. By virtue of the tapered configuration of the blind bore 41, each of the arms 34 has a concave inner surface 52 and the various surfaces 52 converge prior to the contraction of the plurality of arms, the contraction serving to increase the degree of convergence. Preferably the arms are flexed inwardly to substantially meet at their ends as indicated in Fig. 4.

Fig. 7 indicates how a tool generally designated 55 may be employed to thread the tubular insert 30 into a body 56 of relatively soft material having a bore 57 with inner threads 58, the bore threads 58 matching the external threads 32 of the insert. The tool 55 has a pilot end 60 dimensioned to fit into the bore of the insert and has a diametrical pair of blades 61 to engage the end recesses 33 of the insert. Such a tool may be power-driven or may be rotated by a suitable wrench applied to a hexagonal portion 62 of the tool. Preferably the tubular insert 30 is set in from the outer end of the bore and the tool 55 may have an annular stop shoulder 63 to keep the tool from following the tubular insert beyond the desired depth.

After the insert 30 is installed, as indicated in Fig. 7, it is contemplated that a suitable spreader or wedge will be forced into the insert to cause the plurality of arms 34 to spread radially, thereby forcing the teeth 35 into the surrounding material. In the usual practice of the invention the spreader means is relatively short so that the spreader in its final position leaves the inner threads 37 of the tubular insert exposed for subsequent engagement by a conventional screw or stud.

Fig. 8 shows a spreader 65 in the form of a conical wedge, the spreader being driven into the tubular insert 30 by means of a suitable tool 66. The tool 66 may exert steady pressure on the conical wedge or may be actuated by hammer blows. One of the problems involved in the use of a conical spreader is the tendency of the arms 34 to twist in response to the entering movement of the conical wedge, especially if the conical wedge has a smooth surface. Thus, Fig. 10 illustrates the action of a conical wedge 67 having a smooth unbroken surface. When the wedging action creates any substantial pressure outward against the sharp inner edges 51 of the teeth, the teeth tend to twist around to present one of the inner faces 50 to the smooth periphery of the wedge 67.

Returning to Fig. 8, it will be noted that my preferred conical wedge 65 has longitudinal grooves 68 that converge at the point of the wedge, there being four such grooves 68 to correspond to the four teeth 35 of the tubular insert. When the grooved spreader or conical wedge 65 is dropped at random into a tubular insert 30 and forced axially inward by the tool 66, it responds to the axial driving force by initially orienting itself in an automatic manner to place the four grooves 68 in engagement with the four inner edges 51 of the teeth 35. As the tool 66 continues to drive the conical wedge 65 inwardly, the teeth 35 are forced radially outward into the surrounding material of the body 56, as indicated in Fig. 9. During this driving action the grooves 68 maintain sliding engagement with the inner ends of the teeth 35 and relentlessly they hold the teeth to the desired radial movement as distinguished from the previously mentioned twisting movement.

Although the smooth conical wedge 67 of Fig. 10 will not function properly in cooperation with the tubular insert 30, I have found that such an insert may be modified in a manner to make proper cooperation possible.

Figs. 11 to 13 show, for example, a tubular insert 70 with an axial bore 71, the tubular insert 70 being in most respects identical with the tubular insert 30 as indicated by the use of identical numerals for identical parts. The axial bore 71 is formed preferably after the arms of the insert are flexed together as indicated in Fig. 4, and the result may be understood by comparing Fig. 11 with Fig. 4. The arms 72 of the modified tubular insert 70 have the usual concave inner surfaces 52 but these surfaces lead to smaller concave surfaces 73 formed by the bore 71. These smaller concave surfaces 73 may be regarded either as inner surfaces of the arms 72 or as inner surfaces of teeth 75 on the ends of the arms.

Fig. 12 shows the tubular insert 70 threaded into a bore 57 and shows the previously mentioned conical wedge 67 in position for initiation of driving action by the tool 66. It is apparent that the smaller concave surface 73 on the inner end of each tooth provides what may be termed "two-point" contact with the conical wedge 67 regardless of whether or not the circumferential curvature of the conical wedge at the point of contact is identical with the curvature of the concave surfaces 73. Thus the dotted line 76 in Fig. 11 indicates the radial or diametrical plane in which lies the penetrating edge 47 of one of the teeth 75, and it will be noted that the concave surface 73 at the inner end of the tooth extends to both sides of this plane. As a result of this relationship, the conical wedge 67 effectively prevents twisting of the arms 72 and causes the teeth 75 to be driven radially into the surrounding material when the conical wedge is driven home, as indicated in Fig. 13. This action may be compared with that characteristic of the first described form of the invention. Thus, as seen in Fig. 9, the angular heel of the tooth in this instance provides "two point" contact with the surfaces defining groove in the wedge, thereby preventing twisting of the arms. The essential result is thus the same in both cases.

Figs. 14 and 15 illustrate the fact that an insert under my broad concept may be manufactured without bending the arms of the insert inwardly after the slots are cut. The blank shown in Fig. 14 is largely similar to the blank shown in Fig. 1 as indicated by the use of corresponding numerals but differs in that the radial flange 69 of the blank is smaller in relative diameter than the radial flange 45 in Fig. 1. The radial flange 69 is slightly smaller in diameter than the bore 57 into which the insert is to be mounted. The blank of Fig. 14 is processed in the manner heretofore described, but the step of bending the arms inwardly is omitted. The result is the finished insert shown in Fig. 15 having arms 74 with teeth 79 thereon.

Fig. 16 shows a cap screw 77 in the process of being threaded into a tubular insert 70 for the purpose of assembling to the body 56 some cooperative part of device 78, and indicates how in one practice of the invention the conventional cap screw 77 may cooperate with the tubular insert both to expand the insert against the surrounding body and to bind or grip the cap screw in a manner to discourage retraction of the cap screw. It will be noted that the inner threads 37 of the tubular insert in Fig. 16 taper off in depth in the region 80, such taper being produced by employing a conventional tap with the usual tapered nose with shallow leading cutting teeth. It will be further noted that the region 80 lies in the longitudinal zone of the arms 72 so that the region 80 lies in what may be termed a radial expansile portion of the insert. When the cap screw 77 is threaded tightly into the insert, the leading end of the cap screw enters the region 80 of relatively shallow inner threads 37 and acts as a rotary wedge against the shallow threads to locally expand the insert. As a result the cap screw is gripped so effectively by the insert as to resist any tendency of vibration or other forces to unloosen the cap screw.

Fig. 17 illustrates how a special cap screw 81 may combine the function of a conventional cap screw and the function of the smooth conical wedge 67. The special cap screw 81 is similar to a conventional cap screw but has a smooth conical nose 82 of the same general configuration as the previously described smooth conical wedge 67. When the cap screw 81 is threaded ino the insert, it expands the plurality of arms 72 to cause the insert to engage the surrounding material and simultaneously performs the usual function of attaching a part or device 78 to the body 56. It will be evident that the form of cap screw shown in Fig. 17 may be employed with the form of tubular insert shown in Figs. 11 to 13.

Figs. 18, 19 and 20 illustrate successive stages in the processing of a tubular blank generally designated 86, the end view of the finished insert being shown in Fig. 21 and a longitudinal section being shown in Fig. 22. At the stage of manufacture indicated by Fig. 18, the blank 86 has internal threads 87, end recesses 88, external threads 89, a neck 90 of reduced outside diameter, and a radial flange 91 at its inner end. It will be noticed that the blank has a straight bore 92 for its full length. In the same manner as heretofore indicated, four lateral cuts 93 are made in the radial flange 91 to form four penetrating edges 95, and then as illustrated in Fig. 20 longitudinal slots 96 are cut in the end of the blank, thereby forming arms 97 and teeth 98 on the ends of the arms. In the final step of manufacture, the arms 97 are bent together, as indicated in Figs. 21 and 22. It will be noted that each of the arms 97 has a concave inner surface 100 that continues as the concave surface of the inner end of the corresponding tooth 98.

After the tubular insert 86 is threaded into the bore 57 of a body of soft material, a spreader in the form of a smooth-surfaced conical wedge 101 is dropped into the tubular insert as indicated in Fig. 22, and a suitable tool 102 is applied to drive the insert past the arms 97 thereby to drive the teeth 98 into the surrounding material.

Fig. 23 shows the conical wedge 101 in its final position and shows a cap screw 103, the final position of the cap screw being such as to block any significant retraction of the conical wedge.

The present disclosure for the purpose of illustration and to teach the principles involved will suggest to those skilled in the art various changes and substitutions under my basic concept, and I reserve the right to all such departures from the disclosure that properly lie within the scope of my appended claims.

I claim as my invention:

1. Means of the character described for service in a bore in a body of relatively soft material, comprising: a tubular member of such initial external diameter as to be insertable in said bore, said tubular member being formed with an expansible group of arms at its leading end, said arms having outer anchoring projections and each of said arms having two inner faces converging toward one another and meeting in an edge; and spreader means adapted to be driven into said tubular member to expand said group of arms and thereby drive said projections into said relatively soft material, said spreader means having longitudinal channels adapted to receive said edges with the sides of each of the channels contacting the two converging faces of the corresponding arm simultaneously to resist twisting of the arms.

2. Means of the character described for service in a bore in a body of relatively soft material, comprising: a tubular member of such initial external diameter as to be insertable in said bore, said tubular member being formed with an expansible group of longitudinal extensions at its leading end, each of said longitudinal extensions having a radially outwardly extending projection and an inner tapered heel defined by two faces converging to an apex; and spreader means adapted to be driven into said tubular member to expand said group of longitudinal extensions and thereby drive said projections into said relatively soft material, said spreader means having a converging series of grooves corresponding to said longitudinal extensions, said grooves being adapted to engage the converging faces of said heels thereby to resist twisting of the longitudinal extensions as said projections are driven into said relatively soft material.

3. Means of the character described for service in a bore in a body of relatively soft material, comprising: a tubular member of such initial external diameter as to be insertable in said bore, said tubular member being formed with an expansible group of arms at its leading end, said arms having outer anchoring projections and each of said arms having two inner faces converging toward one another and meeting in an edge; and a tapered spreader pin adapted to be driven into said tubular member to expand said group of arms and thereby drive said projections into said relatively soft material, said tapered spreader pin having longitudinal channels adapted to receive said edges with the sides of each of the channels contacting the two converging faces of the corresponding arm simultaneously to resist twisting of the arms.

4. Means of the character described for service in a bore in a body of relatively soft material, comprising: a tubular member of such initial external diameter as to be insertable in said bore, said tubular member being formed with an expansible group of longitudinal extensions at its leading end, each of said longitudinal extensions having a radially outwardly extending projection and an inner tapered heel defined by two faces converging to an apex; and a tapered spreader pin adapted to be driven into said tubular member to expand said group of longitudinal extensions and thereby drive said projections into said relatively soft material, said tapered spreader pin having a converging series of grooves corresponding to said longitudinal extensions, said grooves being adapted to engage the converging faces of said heels thereby to resist twisting of the longitudinal extensions as said projections are driven into said relatively soft material.

JOSEPH ROSAN.